(12) United States Patent
Zhan

(10) Patent No.: US 10,052,777 B2
(45) Date of Patent: Aug. 21, 2018

(54) METHOD AND SYSTEM FOR SEPARATING TOUCH PANEL FROM DISPLAY MODULE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Yifei Zhan, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 219 days.

(21) Appl. No.: 14/797,494

(22) Filed: Jul. 13, 2015

(65) Prior Publication Data
US 2016/0195968 A1    Jul. 7, 2016

(30) Foreign Application Priority Data

Jan. 6, 2015    (CN) .......................... 2015 1 0005157

(51) Int. Cl.
*B32B 38/10*        (2006.01)
*B26D 1/547*       (2006.01)
(Continued)

(52) U.S. Cl.
CPC .............. *B26D 1/547* (2013.01); *B26D 7/018* (2013.01); *B26F 3/12* (2013.01); *B32B 38/10* (2013.01);
(Continued)

(58) Field of Classification Search
CPC . B32B 38/10; B32B 43/006; Y10T 156/1132; Y10T 156/1153;
(Continued)

(56) References Cited

U.S. PATENT DOCUMENTS 4,356,384 A * 10/1982 Gat .................... C30B 33/00
                                                      148/DIG. 93
5,778,969 A *  7/1998 Kyung ............. H01L 21/67103
                                                      118/725
(Continued)

FOREIGN PATENT DOCUMENTS

CN    102236199 A    11/2011
CN    203197984 U     9/2013
(Continued)

OTHER PUBLICATIONS

Office Action in Chinese Patent Application No. 201510005157.8, dated Jan. 13, 2017.

*Primary Examiner* — Philip Tucker
*Assistant Examiner* — Nickolas Harm
(74) *Attorney, Agent, or Firm* — Brooks Kushman P.C.

(57) ABSTRACT

The present disclosure provides a method and a system for separating a touch panel from a display module of a touch display device. The system includes a carrying unit configured to secure a to-be-processed touch display device, and a disassembling unit configured to soften an adhesive between the touch panel and the display module so as to separate the touch panel from the display module, thereby to disassemble the touch display device secured on the carrying unit.

12 Claims, 2 Drawing Sheets

(51) Int. Cl.
  *B26D 7/01* (2006.01)
  *B26F 3/12* (2006.01)
  *B32B 43/00* (2006.01)

(52) U.S. Cl.
  CPC ........ *B32B 43/006* (2013.01); *Y10T 156/1132* (2015.01); *Y10T 156/1153* (2015.01); *Y10T 156/1184* (2015.01); *Y10T 156/1911* (2015.01); *Y10T 156/1944* (2015.01); *Y10T 156/1967* (2015.01)

(58) Field of Classification Search
  CPC ......... Y10T 156/1184; Y10T 156/1911; Y10T 156/1944; Y10T 156/1967
  USPC ................. 156/707, 711, 717, 752, 758, 762
  See application file for complete search history.

(56) References Cited

U.S. PATENT DOCUMENTS

| | | | | |
|---|---|---|---|---|
| 6,837,410 | B1* | 1/2005 | Yeh | C03B 33/095 225/93.5 |
| 8,118,075 | B2* | 2/2012 | Sampica | B26D 1/547 156/711 |
| 8,141,611 | B2* | 3/2012 | Lai | B23D 49/02 156/701 |
| 8,261,804 | B1* | 9/2012 | Huang | B28D 5/0094 156/707 |
| 2003/0121601 | A1* | 7/2003 | Tajima | G09F 7/18 156/254 |
| 2003/0230381 | A1* | 12/2003 | Watanabe | H01J 9/52 156/250 |
| 2008/0245483 | A1* | 10/2008 | Toyoshima | B32B 43/006 156/763 |
| 2010/0199818 | A1* | 8/2010 | Lee | B26D 1/547 83/16 |
| 2010/0263794 | A1* | 10/2010 | George | B32B 43/006 156/707 |
| 2011/0023672 | A1* | 2/2011 | Blanchard | B32B 43/006 83/15 |
| 2011/0174445 | A1* | 7/2011 | Ciliberti | H01L 21/67132 156/752 |
| 2011/0180218 | A1* | 7/2011 | Ciliberti | G02F 1/1303 156/705 |
| 2014/0102270 | A1* | 4/2014 | Teck | B26D 3/28 83/13 |
| 2014/0130987 | A1* | 5/2014 | Li | B32B 38/10 156/761 |
| 2014/0196854 | A1* | 7/2014 | Lee | B32B 43/006 156/752 |
| 2015/0083340 | A1* | 3/2015 | Price | B32B 43/006 156/701 |
| 2016/0031106 | A1* | 2/2016 | Wu | B26D 3/28 83/15 |

FOREIGN PATENT DOCUMENTS

| | | |
|---|---|---|
| CN | 103676282 A | 3/2014 |
| TW | 201029817 A | 8/2010 |

* cited by examiner

METHOD AND SYSTEM FOR SEPARATING TOUCH PANEL FROM DISPLAY MODULE

CROSS-REFERENCE TO RELATED APPLICATION

The present disclosure claims a priority of the Chinese patent application No. 201510005157.8 filed on Jan. 6, 2015, which is incorporated herein by reference in its entirety.

TECHNICAL FIELD

The present disclosure relates to the field of display technology, in particular to a method and a system for separating a touch panel from a display module.

BACKGROUND

Along with the rapid development of the global economy, consumer electrical and electronic products, such as mobile phones, have come from one generation to the next at an ever-increasingly faster speed, and their abandonment amount has increased year by year. However, most of these abandoned products include touch display elements which still have perfect functions and which each include a touch panel and a display module.

Currently, these abandoned products are mainly handled by mechanical pulverization or manual disassembly, so as to remove the touch panel from a surface of the display module. However, the existing handling mode is inefficient. In addition, the touch panel is firmed adhered onto the display module through an adhesive, so the touch panel or the display module will readily be damaged during the removal thereof, and thereby a recovery rate of the touch panel or the display module will be remarkably reduced.

SUMMARY

An object of the present disclosure is to provide a method and a system for separating a touch panel from a display module, so as to separate the touch panel from the display module without damaging the touch panel and the display module, thereby to improve a recovery rate of the touch panel and the display module.

In one aspect, the present disclosure provides in one embodiment a system for separating a touch panel from a display module of a touch display device, including a carrying unit configured to secure a to-be-processed touch display device including the touch panel and the display module, and a disassembling unit configured to soften an adhesive between the touch panel and the display module so as to separate the touch panel from the display module, thereby to disassemble the touch display device secured on the carrying unit.

The carrying unit includes a first electric motor arranged on a base, a first screw assembly connected to the first electric motor, and a vacuum-adsorbing table connected to the first screw assembly and configured to carry the touch display device. The first screw assembly is capable of driving the vacuum-adsorbing table to move up or down during operation of the first electric motor.

The first screw assembly includes a connection plate connected to the vacuum-adsorbing table, a first screw nut connected to the connection plate, and a first ball screw in engagement with the first screw nut and connected to the first electric motor.

The disassembling unit includes a second electric motor arranged on the base, a second screw assembly connected to the second electric motor, and a movable assembly connected to the second screw assembly and configured to carry a heating module. The second screw assembly is capable of driving the movable assembly to move during operation of the second electric motor, thereby driving the heating module to move.

The movable assembly includes a guide rail secured onto the base via a support, and a slider arranged on the guide rail. The heating module is secured onto the slider.

The second screw assembly includes a connection block connected to the slider, a second screw nut connected to the connection block, and a second ball screw in engagement with the second screw nut and connected to the second electric motor.

The heating module includes a heating wire and a low-voltage direction current (DC) power source for energizing the heating wire.

In another aspect, the present disclosure provides in one embodiment a method for separating a touch panel from a display module for use in the above-mentioned system, including: securing a to-be-processed touch display device including the touch panel and the display module; and softening an adhesive between the touch panel and the display module, and separating the touch panel from the display module.

The method includes: starting up a first electric motor and adjusting a height of a vacuum-adsorbing table, so as to enable a heating wire and the adhesive to be within an identical plane; energizing the heating wire and adjusting a voltage of a low-voltage direct current power source, so as to enable a temperature of the heating wire to be higher than a softening temperature of the adhesive; and starting up a second electric motor, so as to enable the heating wire to move from one side of the touch display device to the other side and soften the entire adhesive between the touch panel and the display module, thereby to separate the touch panel from the display module.

In yet another aspect, the present disclosure provides in one embodiment a system for separating a touch panel from a display module, including: a base; a first electric motor arranged on the base; a first screw assembly connected to the first electric motor; a vacuum-adsorbing table connected to the first screw assembly and configured to carry a to-be-processed touch display device including the touch panel and the display module; a second electric motor arranged on the base; a second screw assembly connected to the second electric motor; a pair of guide rails secured onto the base; a pair of sliders arranged on the pair of guide rails and connected to the second screw assembly; and a heating wire arranged between the pair of sliders and arranged parallel to the vacuum-adsorbing table. The first screw assembly is capable of driving the vacuum-adsorbing table to move up or down relative to the heating wire during operation of the first electric motor, and the second screw assembly is capable of driving the heating wire to move from one side of the vacuum-adsorbing table to the other side through the pair of slides during operation of the second electric motor.

Further, the heating wire is straightened by the pair of sliders.

Further, the first screw assembly includes: a connection plate connected to the vacuum-adsorbing table; a first screw nut connected to the connection plate; and a first ball screw in engagement with the first screw nut and connected to the first electric motor.

Further, the second screw assembly includes: a connection block connected to the pair of slides; a second screw nut connected to the connection block; and a second ball screw in engagement with the second screw nut and connected to the second electric motor.

Further, the second ball screw is perpendicular to the first ball screw.

Further, the second ball screw is parallel to the vacuum-adsorbing table and perpendicular to the heating wire; the first ball screw is perpendicular to the vacuum-adsorbing table and perpendicular to the heating wire and the second ball screw.

According to the embodiments of the present disclosure, when disassembling the touch display device, the adhesive between the touch panel and the display module is softened, so as to separate the touch panel from the display module without damaging the touch panel and the display panel. As a result, it is able to disassemble the touch display device automatically using a mechanical device at a controllable temperature without damaging the touch panel and the display module, thereby to improve the recovery rate of the touch panel and the display module.

DETAILED DESCRIPTION

Figure 1:
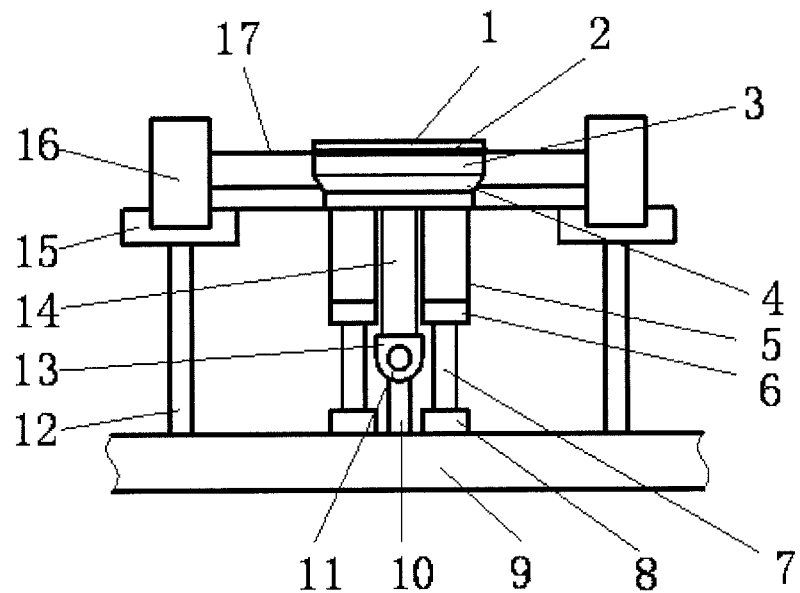
FIG. 1 is a back view of a system for separating a touch panel from a display module according to one embodiment of the present disclosure.
Figure 2:
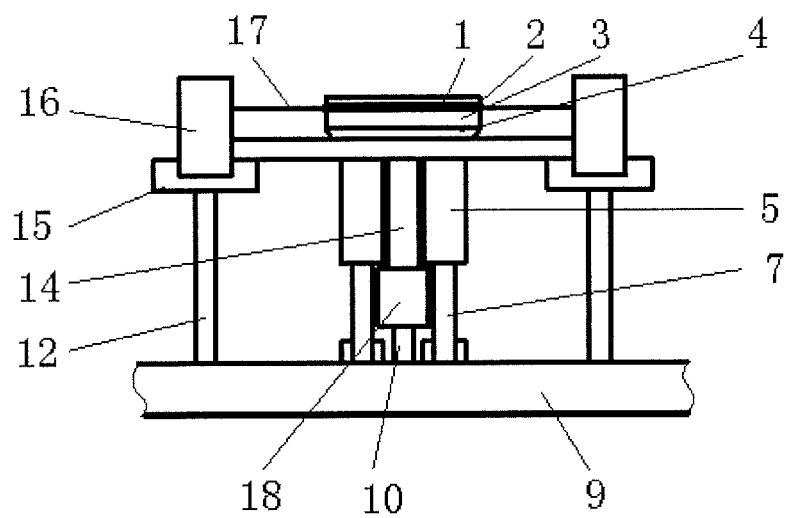
FIG. 2 is a front view of the system for separating a touch panel from a display module according to one embodiment of the present disclosure.

In order to make the objects, the technical solutions and the advantages of the present disclosure more apparent, the present disclosure will be described hereinafter in conjunction with the drawings and embodiments.

The present disclosure provides in the embodiments a method and a system for separating a touch panel from a display module, so as to separate the touch panel from the display module without damaging the touch panel and the display module, thereby to improve a recovery rate of the touch panel and the display module.

The present disclosure provides in one embodiment a system for separating a touch panel from a display module of a touch display device, which includes: a carrying unit configured to secure thereon the to-be-processed touch display device, and a disassembling unit configured to soften an adhesive between the touch panel and the display module so as to separate the touch panel from the display module. The disassembling unit disassembles the touch display device secured on the carrying unit.

According to the embodiment of the present disclosure, when disassembling the touch display device, the adhesive between the touch panel and the display module is softened, so as to separate the touch panel from the display module without damaging the touch panel and the display panel. As a result, it is able to disassemble the touch display device automatically using a mechanical device at a controllable temperature without damaging the touch panel and the display module, thereby to improve the recovery rate of the touch panel and the display module.

Further, the carrying unit includes: a first electric motor arranged on a base; a first screw assembly connected to the first electric motor; and a vacuum-adsorbing table connected to the first screw assembly and configured to carry thereon the touch display device. The first screw assembly is capable of driving the vacuum-adsorbing table to move up or down during the operation of the first electric motor.

To be specific, the first screw assembly may include a connection plate connected to the vacuum-adsorbing table, a first screw nut connected to the connection plate, and a first ball screw in engagement with the first screw nut and connected to the first electric motor.

Further, the disassembling unit includes a second electric motor arranged on the base, a second screw assembly connected to the second electric motor, and a movable assembly connected to the second screw assembly and configured to carry thereon a heating module.

The second screw assembly is capable of driving the movable assembly to move during the operation of the second electric motor, thereby driving the heating module to move.

To be specific, the movable assembly may include a guide rail secured onto the base through a support, and a slider arranged on the guide rail. The heating module is secured onto the slider. The second screw assembly is capable of driving the slider to move along the guide rail during the operation of the second electric motor, thereby driving the heating module to move.

The second screw assembly may include a connection block connected to the slider, a second screw nut connected to the connection block, and a second ball screw in engagement with the second screw nut and connected to the second electric motor.

To be specific, the heating module may include a heating wire and a low-voltage direct current power source for energizing the heating wire so as to enable the heating wire to be at a predetermined temperature.

The present disclosure further provides in one embodiment a method for separating a touch panel from a display module for use in the above-mentioned system, which includes: securing the to-be-processed touch display device; and softening the adhesive between the touch panel and the display module, and separating the touch panel from the display module.

According to the embodiment of the present disclosure, when disassembling the touch display device, the adhesive between the touch panel and the display module is softened, so as to separate the touch panel from the display module without damaging the touch panel and the display panel. As a result, it is able to disassemble the touch display device automatically using a mechanical device at a controllable temperature without damaging the touch panel and the display module, thereby to improve the recovery rate of the touch panel and the display module.

To be specific, the method includes: starting up the first electric motor and adjusting a height of the vacuum-adsorbing table, so as to enable the heating wire and the adhesive to be within an identical plane; energizing the heating wire and adjusting a voltage of the low-voltage DC power source, so as to enable a temperature of the heating wire to be higher than a softening temperature of the adhesive; and starting up the second electric motor, so as to enable the heating wire to move from one side of the touch display device to the other side and soften the entire adhesive between the touch panel and the display module, thereby to separate the touch panel from the display module.

The method and system for separating a touch panel from a display module will be described hereinafter in conjunction with the drawings.

As shown in FIGS. 1-4, the to-be-processed touch display device is composed of a touch panel 1, a display module 3, and an adhesive 2 arranged between the touch panel 1 and the display module 3. The touch panel 1 is adhered onto the display module 3 through the adhesive 2.

The system for separating the touch panel from the display module in the embodiments of the present disclosure includes a vacuum-adsorbing table 4 for securing thereon the touch display device, a connection plate 5, a first screw nut 6, a first ball screw 7, a first electric motor 8, a base 9, a seat 10, a second ball screw 11, a support 12, a second screw nut 13, a connection block 14, a guide rail 15, a slider 16, a heating wire 17, a second electric motor 18, and a low-voltage DC power source connected to the heating wire 17. The first electric motor 8 is secured onto the base 9, the first ball screw 7 is connected to the first electric motor 8, the first screw nut 6 is in engagement with the first ball screw 7, the vacuum-adsorbing table 4 is connected to the first screw nut 6 through the connection plate 5, and the first electric motor 8 is operated so as to drive the vacuum-adsorbing table 4 to move up or down, thereby to adjust a height of the touch display device. The guide rail 15 is secured onto the base 9 through the support 12, the slider 16 is arranged on the guide rail 15, and the heating wire 17 is secured onto the slider 16. The second electric motor 18 is secured onto the base 9 through the seat 10, the second ball screw 11 is connected to the second electric motor 18, the second screw nut 13 is in engagement with the second ball screw 11, the slider 16 is connected to the second screw nut 13 through the connection block 14, and the second electric motor 18 is operated so as to drive the slider 16 to move, thereby to drive the heating wire 17 to move.

During the operation of the system, the to-be-processed touch display device is secured onto the vacuum-adsorbing table 4 by vacuum adsorption, and a height of the vacuum-adsorbing table 4 is adjusted by the first electric motor 8, so that the heating wire 17 and the adhesive 2 are arranged within an identical plane. Alternatively, the heating wire 17 is aligned with a middle part of the adhesive 2. The heating wire 17 is energized by the low-voltage DC power source, and a voltage of the voltage-lower DC power source may be adjusted so as to enable a temperature of the heating wire 17 to be slightly higher than a softening temperature of the adhesive 2. The second electric motor 18 is started up so as to drive the heating wire 17 to move, thereby to enable the heating wire 17 to be in contact with the adhesive 2 from one side of the touch display device.

The adhesive 2 in contact with the heating wire 17 is softened due to the heat from the heating wire 17, thereby its adhesive ability is lost. Along with the movement of the heating wire 17, the adhesive 2 is softened gradually, and when the heating wire 17 moves to the other side of the touch display device, the adhesive ability of the entire adhesive 2 is lost. As a result, it is able to separate the touch panel from the display module.

Figure 3:
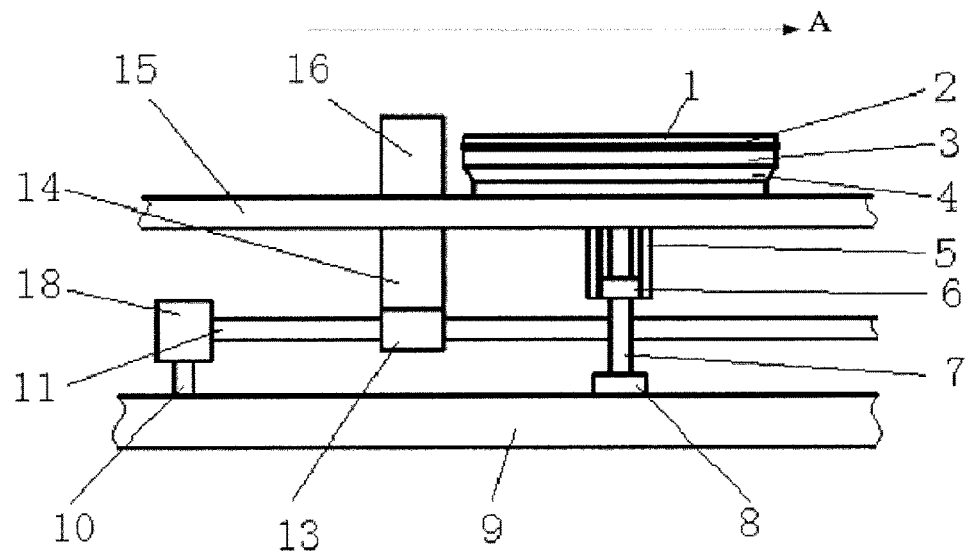
FIG. 3 is a left view of the system for separating a touch panel from a display module according to one embodiment of the present disclosure.
Figure 4:
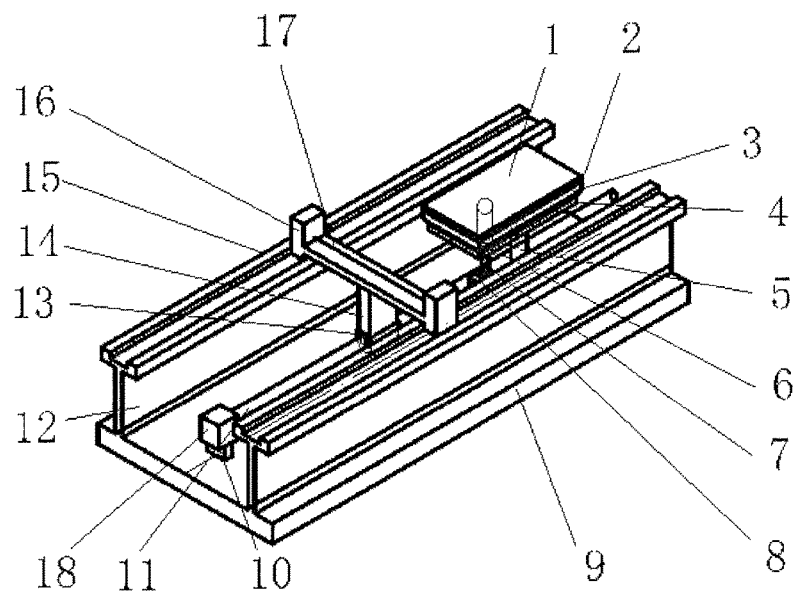
FIG. 4 is a perspective view showing the system for separating a touch panel from a display module according to one embodiment of the present disclosure.

In addition, as shown in FIG. 3, during the operation of the system, it is able to control the movement speed of the heating wire 17 by the second electric motor 18, thereby to control the disassembling speed of the touch panel from the display module. In FIG. 3, A represents a movement direction of the heating wire 17, i.e., a direction where the touch panel is separated from the display module by the system.

According to the embodiments of the present disclosure, when disassembling the touch display device, the adhesive between the touch panel and the display module is softened, so as to separate the touch panel from the display module without damaging the touch panel and the display panel. As a result, it is able to disassemble the touch display device automatically using a mechanical device at a controllable temperature without damaging the touch panel and the display module, thereby to improve the recovery rate of the touch panel and the display module.

The above are merely the preferred embodiments of the present disclosure. It should be appreciated that, a person skilled in the art shall make further modifications and improvements without departing from the principle of the present disclosure, and these modifications and improvements shall also fall within the scope of the present disclosure.

What is claimed is:

1. A system for separating a touch panel from a display module, comprising:
   a carrying unit configured to secure a to-be-processed touch display device including the touch panel and the display module; and
   a disassembling unit configured to soften an adhesive between the touch panel and the display module so as to separate the touch panel from the display module;
   wherein the disassembling unit is configured to disassemble the touch display device secured on the carrying unit, and
   wherein the carrying unit comprises:
      a first electric motor arranged on a base;
      a first screw assembly connected to the first electric motor, wherein the first screw assembly comprises a first ball screw connected to the first electric motor; and
      a vacuum-adsorbing table connected to the first screw assembly and configured to carry the touch display device,
      wherein the first screw assembly is capable of driving the vacuum-adsorbing table to move up or down during operation of the first electric motor;
   wherein the disassembling unit comprises:
      a second electric motor arranged on the base;
      a second screw assembly connected to the second electric motor, wherein the second screw assembly comprises a second ball screw connected to the second electric motor; and
      a movable assembly connected to the second screw assembly and carrying a heating module,
      wherein the first ball screw is perpendicular to the second ball screw, the second screw assembly is capable of driving the movable assembly to move during operation of the second electric motor to drive the heating module to move along a direction perpendicular to a movement direction of the vacuum-adsorbing table.

2. The system according to claim 1, wherein the first screw assembly further comprises:
   a connection plate connected to the vacuum-adsorbing table;
   a first screw nut connected to the connection plate; and
   the first ball screw is in engagement with the first screw nut.

3. The system according to claim 1, wherein the movable assembly comprises:

a guide rail secured onto the base via a support; and
a slider arranged on the guide rail;
wherein the heating module is secured onto the slider.

4. The system according to claim 3, wherein the second screw assembly further comprises:
a connection block connected to the slider;
a second screw nut connected to the connection block; and
the second ball screw is in engagement with the second screw nut.

5. The system according to claim 1, wherein the heating module comprises a heating wire and a direct current power source for energizing the heating wire.

6. A method for separating a touch panel from a display module for use in a system, comprising:
a carrying unit configured to secure a to-be-processed touch display device including the touch panel and the display module; and
a disassembling unit configured to soften an adhesive between the touch panel and the display module so as to separate the touch panel from the display module;
wherein the disassembling unit is configured to disassemble the touch display device secured on the carrying unit, and
with the carrying unit comprising:
a first electric motor arranged on a base;
a first screw assembly connected to the first electric motor, wherein the first screw assembly comprises a first ball screw connected to the first electric motor; and
a vacuum-adsorbing table connected to the first screw assembly and configured to carry the touch display device,
wherein the first screw assembly is capable of driving the vacuum-adsorbing table to move up or down during operation of the first electric motor, and
wherein the disassembling unit comprises:
a second electric motor arranged on the base;
a second screw assembly connected to the second electric motor, wherein the second screw assembly comprises a second ball screw connected to the second electric motor; and
a movable assembly connected to the second screw assembly and carrying a heating module,
wherein the first ball screw is perpendicular to the second ball screw, the second screw assembly is capable of driving the movable assembly to move during operation of the second electric motor to drive the heating module to move along a direction perpendicular to a movement direction of the vacuum-adsorbing table;
wherein the method comprises:
securing a to-be-processed touch display device including the touch panel and the display module; and
softening an adhesive between the touch panel and the display module, and separating the touch panel from the display module.

7. The method according to claim 6, comprising:
starting up a first electric motor and adjusting a height of the vacuum-absorbing table, so as to enable a heating wire and the adhesive to be within an identical plane;
energizing the heating wire and adjusting a voltage of a direct current power source, so as to enable a temperature of the heating wire to be higher than a softening temperature of the adhesive; and starting up a second electric motor, so as to enable the heating wire to move from one side of the touch display device to the other side and soften the entire adhesive between the touch panel and the display module, thereby to separate the touch panel from the display module.

8. A system for separating a touch panel from a display module, comprising:
a base;
a first electric motor arranged on the base;
a first screw assembly connected to the first electric motor, wherein the first screw assembly comprises a first ball screw connected to the first electric motor;
a vacuum-adsorbing table connected to the first screw assembly and configured to carry a to-be-processed touch display device including the touch panel and the display module;
a second electric motor arranged on the base;
a second screw assembly connected to the second electric motor, wherein the second screw assembly comprises a second ball screw connected to the second electric motor;
a pair of guide rails secured onto the base;
a pair of sliders arranged on the pair of guide rails and connected to the second screw assembly; and
a heating wire arranged between the pair of sliders and arranged parallel to the vacuum-adsorbing table,
wherein the first screw assembly is capable of driving the vacuum-adsorbing table to move up or down relative to the heating wire during operation of the first electric motor, and the second screw assembly is capable of driving the heating wire to move from one side of the vacuum-adsorbing table to the other side through the pair of sliders during operation of the second electric motor;
wherein the first ball screw is perpendicular to the second ball screw, the second screw assembly is capable of driving the movable assembly to move during operation of the second electric motor to drive the heating module to move along a direction perpendicular to a movement direction of the vacuum-adsorbing table.

9. The system according to claim 8, wherein the heating wire is straightened by the pair of sliders.

10. The system according to claim 8, wherein the first screw assembly further comprises:
a connection plate connected to the vacuum-adsorbing table;
a first screw nut connected to the connection plate; and
the first ball screw is in engagement with the first screw nut.

11. The system according to claim 10, wherein the second screw assembly further comprises:
a connection block connected to the pair of sliders;
a second screw nut connected to the connection block; and
the second ball screw is in engagement with the second screw nut.

12. The system according to claim 11, wherein the second ball screw is parallel to the vacuum-adsorbing table and perpendicular to the heating wire; the first ball screw is perpendicular to the vacuum-adsorbing table and perpendicular to the heating wire and the second ball screw.

* * * * *